US012673767B2

(12) United States Patent
Hayes et al.

(10) Patent No.: US 12,673,767 B2
(45) Date of Patent: Jul. 7, 2026

(54) VTOL AIRCRAFT

(71) Applicant: AIRBUS OPERATIONS LIMITED, Bristol (GB)

(72) Inventors: Alexander Hayes, Bristol (GB); Ashley Bidmead, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 396 days.

(21) Appl. No.: 18/539,390

(22) Filed: Dec. 14, 2023

(65) Prior Publication Data

US 2024/0239480 A1  Jul. 18, 2024

(30) Foreign Application Priority Data

Jan. 16, 2023  (GB) ..................................... 2300601

(51) Int. Cl.
B64C 25/44 (2006.01)
B60T 7/12 (2006.01)
(Continued)

(52) U.S. Cl.
CPC ................ B64C 25/44 (2013.01); B60T 7/12 (2013.01); B60T 13/148 (2013.01); B64C 25/60 (2013.01);
(Continued)

(58) Field of Classification Search
CPC ......... B64C 25/34; B64C 25/42; B64C 25/44; B64C 25/60; B64C 29/0008; B64C 2025/008; B64C 29/00–04; B60T 7/12; B60T 13/148; B60T 2260/06; B60T 11/00–34
See application file for complete search history.

(56) References Cited

U.S. PATENT DOCUMENTS

| | | | | | |
|---|---|---|---|---|---|
| 4,821,983 | A | * | 4/1989 | Aubry | F16F 9/348 267/64.23 |
| 5,330,132 | A | * | 7/1994 | Lucienne | F16F 9/088 244/104 FP |

(Continued)

FOREIGN PATENT DOCUMENTS

| | | | |
|---|---|---|---|
| GB | 1173051 A | 12/1969 | |
| JP | H06321191 A | 11/1994 | |
| RU | 2767571 C1 * | 3/2022 | ............. B64C 27/04 |

OTHER PUBLICATIONS

Search and Examination Report for GB2300601.8, dated Jun. 29, 2023, 5 pages.

*Primary Examiner* — Tinh T Dang
(74) *Attorney, Agent, or Firm* — Nixon & Vanderhye P.C.

(57) ABSTRACT

A VTOL aircraft (100) including a wheel braking system and a hydraulically coupled shock absorber (5) and brake piston (7). The shock absorber (5) carries the weight of the aircraft (100) when a wheel (1) connected to the shock absorber (5) is in contact with a ground surface. A hydraulic pressure within the shock absorber (5) is proportional to the weight of the aircraft (100) carried by the shock absorber (5). The shock absorber (5) and brake piston (7) are hydraulically coupled such that, when the pressure within the shock absorber (5) exceeds a threshold pressure, the pressure within the shock absorber (5) actuates the brake piston (7) to apply a braking torque to the wheel (1) of the VTOL aircraft (100).

16 Claims, 2 Drawing Sheets

(51) Int. Cl.
 B60T 13/14 (2006.01)
 B64C 25/60 (2006.01)
 *B64C 29/00* (2006.01)

(52) U.S. Cl.
 CPC ....... *B60T 2260/06* (2013.01); *B64C 29/0008*
 (2013.01)

(56) References Cited

U.S. PATENT DOCUMENTS

| 8,490,919 B2* | 7/2013 | Nannoni | B64C 25/14 |
| | | | 244/108 |
| 2007/0095976 A1* | 5/2007 | Bietenhader | B64C 25/00 |
| | | | 244/102 A |
| 2010/0116931 A1 | 5/2010 | Wilby | |
| 2013/0105624 A1 | 5/2013 | Dubois | |
| 2018/0050796 A1* | 2/2018 | Wittmaak | B60L 7/02 |
| 2021/0086734 A1 | 3/2021 | Georgin | |

* cited by examiner

VTOL AIRCRAFT

RELATED APPLICATION

This application incorporates by reference and claims priority to United Kingdom application GB 2300601.8, filed Jan. 16, 2023.

BACKGROUND OF THE INVENTION

The present disclosure relates to vertical take-off and landing (VTOL) aircraft.

The present invention concerns VTOL aircraft comprising a wheel braking system. More particularly, but not exclusively, this invention concerns a VTOL aircraft comprising a hydraulically coupled shock absorber and brake piston.

VTOL aircraft may have wheels which enable the aircraft to taxi upon the ground using the horizontal component of the lift generated by the aircraft. The wheels of VTOL aircraft may be provided with brakes to control the movement of the aircraft while taxiing. Prior art VTOL aircraft typically comprise separate hydraulic braking systems which can be complex and can account for a significant portion of the overall mass of the aircraft.

SUMMARY OF THE INVENTION

The present invention seeks to mitigate one or more of the above-mentioned problems. Alternatively or additionally, the present invention seeks to provide an improved VTOL aircraft.

The present invention provides a VTOL aircraft comprising a first wheel attached to a shock absorber configured such that the shock absorber carries at least part of the weight of the aircraft when the first wheel is in contact with a ground surface, a hydraulic pressure within the shock absorber thereby being proportional to the weight of the aircraft carried by the shock absorber, and a brake piston configured to provide a braking torque to a second wheel of the aircraft. The shock absorber and brake piston are hydraulically coupled such that, when the pressure within the shock absorber exceeds a threshold pressure, the pressure within the shock absorber actuates the brake piston to apply a braking torque to the second wheel.

It will be understood that, during take-off, landing, and taxiing, the weight of the aircraft carried by the shock absorber, and thereby the hydraulic pressure within the shock absorber, is proportional to the vertical component of lift generated by the VTOL aircraft. The VTOL aircraft may therefore be any VTOL aircraft which is capable of producing a vertical component of lift when the wheels are stationary upon the ground surface. The VTOL aircraft may therefore by a helicopter, a tilt-rotor aircraft, or a thrust vectoring aeroplane. When the pressure within the shock absorber exceeds the threshold pressure, the hydraulic pressure within the shock absorber may be equal to the hydraulic pressure within the brake piston. The first wheel may form part of a pair of wheels, or a group of three or more wheels attached to a single shock absorber. The second wheel may form part of a pair of wheels, or a group of three or more wheels attached to a single shock absorber.

The VTOL aircraft of the invention therefore comprises a braking system that is pressurised by the compression of a load-bearing shock absorber when the aircraft lands. Such an arrangement may advantageously reduce the weight and complexity of the braking system relative to prior art braking systems.

The threshold pressure may correspond to a pressure within the shock absorber that corresponds to a condition in which the aircraft is able to taxi under a horizontal component of lift generated by the aircraft. The brake piston may therefore advantageously only become engaged when the vertical component of lift generated by the aircraft is below that at which the aircraft is able to taxi. Or conversely, the brake piston may become disengaged only when the vertical component of lift generated by the aircraft is equal to or greater than the vertical component of lift at which the aircraft is able to taxi. The threshold pressure may between 70% and 95% of the pressure within the shock absorber when the aircraft is at rest upon the ground surface, with no vertical component of lift being generated by the aircraft. The threshold pressure may be between 75% and 90% of the pressure within the shock absorber when the aircraft is at rest upon the ground surface, with no vertical component of lift being generated by the aircraft. The threshold pressure may be equal to the pressure within the shock absorber when the aircraft is in contact with the ground surface and the aircraft is generating a vertical component of lift equal to between 5 and 30% of the vertical component of lift required for the aircraft to take-off. The threshold pressure may be equal to the pressure within the shock absorber when the aircraft is in contact with the ground surface and the aircraft is generating a vertical component of lift equal to between 10 and 25% of the vertical component of lift required for the aircraft to take-off.

The first wheel and the second wheel may be the same wheel. The shock absorber may therefore be coupled to a wheel of the aircraft and the brake piston may be configured to provide a braking torque to the wheel that is attached to the shock absorber. Alternatively, the second wheel may not be attached to the shock absorber. For example, the wheel may be attached to a different shock absorber.

The VTOL aircraft may further comprise a valve system hydraulically connected between the shock absorber and the brake piston. Optionally, the valve system is configured to permit hydraulic fluid to flow from the shock absorber to the brake piston when the pressure within the shock absorber exceeds a threshold pressure. When the pressure within the shock absorber exceeds the threshold pressure, the valve system may be configured to prevent hydraulic fluid flowing from the brake piston to the shock absorber. The threshold pressure above which the valve system is configured to allow hydraulic fluid to flow from the shock absorber to the brake piston may be approximately equal to the hydraulic pressure within the brake piston above which the brake piston is configured to provide a braking torque to the first or second wheel of the aircraft. This pressure may be referred to as a "zero torque pressure" (ZTP) because it is the hydraulic pressure within the brake piston at or below which zero braking torque is applied to the wheel. In some embodiments, the threshold pressure may be less than the ZTP. In some embodiments the threshold pressure may be greater than the ZTP The valve system may have two states. The first state may be one in which the valve system is configured to permit hydraulic fluid to flow from the shock absorber to the brake piston and to prevent hydraulic fluid flowing from the brake piston to the shock absorber. The second state may be one in which the valve system is configured to permit hydraulic fluid to flow freely between the brake piston and the shock absorber.

The shock absorber, brake piston, and valve system may form part of a hydraulic system of the aircraft. The shock absorber may be on a shock absorber side of the valve system. The brake piston may be on a brake piston side of the valve system. The hydraulic pressure on the shock absorber side of valve system may be equal to the hydraulic pressure within the shock absorber. The hydraulic pressure on the brake piston side of valve system may be equal to the hydraulic pressure within the brake piston.

The valve system may be configured to be actuated from its second state to its first state by the hydraulic pressure in the shock absorber. The valve system may be configured to be actuated from its second state to its first state by the hydraulic pressure in the shock absorber when the pressure within the shock absorber exceeds a threshold pressure. The valve system may comprise a spring configured to provide a force to actuate the valve system to its first state. The spring may be configured to provide a force in parallel with the force exerted on the valve system by the pressure in the shock absorber. The valve system may be configured such that, when the pressure within the shock absorber exceeds a threshold pressure, the valve system is actuated to its first state by the hydraulic pressure in the shock absorber and by the spring.

The valve system may be configured to be actuated from its first state to its second state by the hydraulic pressure in the brake piston when the pressure within the shock falls below a threshold pressure. The valve system may be configured such that, when the pressure within the shock absorber falls below a threshold pressure, the valve system is actuated from its first state to its second state by the hydraulic pressure in the brake piston. The valve system may be configured such that the hydraulic pressure in the brake piston and the hydraulic pressure in the shock absorber (and spring, where present) provide opposing forces on the valve system to actuate the valve system between its first and second states.

Optionally, the valve system comprises a check valve configured to permit hydraulic fluid to flow from the shock absorber to the brake piston when the pressure within the shock absorber exceeds a threshold pressure. Where the valve system has first and second states, the first state may be one in which the check valve is configured to permit hydraulic fluid to flow from the shock absorber to the brake piston and to prevent hydraulic fluid flowing from the brake piston to the shock absorber. Optionally, the valve system comprises a return valve configured to allow hydraulic fluid to flow from the brake piston to the shock absorber at a pressure that is equal to or lower than the threshold pressure above which the valve system is configured to allow hydraulic fluid to flow from the shock absorber to the brake piston. Where the valve system has first and second states, the second state may be one in which the return valve is configured to allow hydraulic fluid to flow from the brake piston to the shock absorber at a pressure that is equal to or lower than the threshold pressure.

The VTOL aircraft may further comprise a switch that is operable to hydraulically decouple the shock absorber and brake piston. In certain embodiments of the invention, it may be desirable to hydraulically decouple the shock absorber and brake piston. For example, when the aircraft is at rest upon the ground it may be desirable to remove the braking torque from the second wheel so that the aircraft can be towed, for example. This may be achieved by hydraulically isolating the brake piston from the shock absorber and removing hydraulic fluid from the brake piston to remove the braking torque applied to the second wheel.

The VTOL aircraft may further comprise an accumulator that is operable to drain hydraulic fluid from the brake piston. The accumulator may also be operable to pump hydraulic fluid back into the brake piston.

The VTOL aircraft may further comprise a second brake piston configured to provide a braking torque to a third wheel of the aircraft. Optionally, the shock absorber and second brake piston are hydraulically coupled such that, when the pressure within the shock absorber exceeds the threshold pressure, the pressure within the shock absorber actuates the second brake piston to apply a braking torque to the third second wheel. In this case, the shock absorber may be configured to provide a braking torque to both the second and third wheels. In other embodiments of the invention, a single shock absorber may be configured to provide a braking torque to more than two wheels. The second and third wheels may form part of a pair or group of wheels attached to a single shock absorber. Alternatively, the second and third wheels may not be attached to the same shock absorber.

The VTOL aircraft may comprise a further wheel attached to a further shock absorber configured such that the further shock absorber carries at least part of the weight of the aircraft when the further wheel is in contact with a ground surface, a hydraulic pressure within the further shock absorber thereby being proportional to the weight of the aircraft carried by the further shock absorber, and a further brake piston configured to provide a braking torque to the further wheel. Optionally, the further shock absorber and further brake piston are hydraulically coupled such that, when the pressure within the further shock absorber exceeds a threshold pressure, the pressure within the further shock absorber actuates the further brake piston to apply a braking torque to the further wheel.

The further shock absorber and further piston may be hydraulically coupled independently of the first shock absorber and first piston. There may be multiple independently coupled pairs of shock absorbers and brake pistons. For example, each wheel (or group of wheels) of the aircraft may be attached to a respective shock absorber, and each respective shock absorber may be hydraulically coupled to a brake piston of its respective wheel (or group of wheels).

DESCRIPTION OF THE DRAWINGS

Embodiments of the present invention will now be described by way of example only with reference to the accompanying schematic drawings of which.

DETAILED DESCRIPTION

Figures 1, 2:
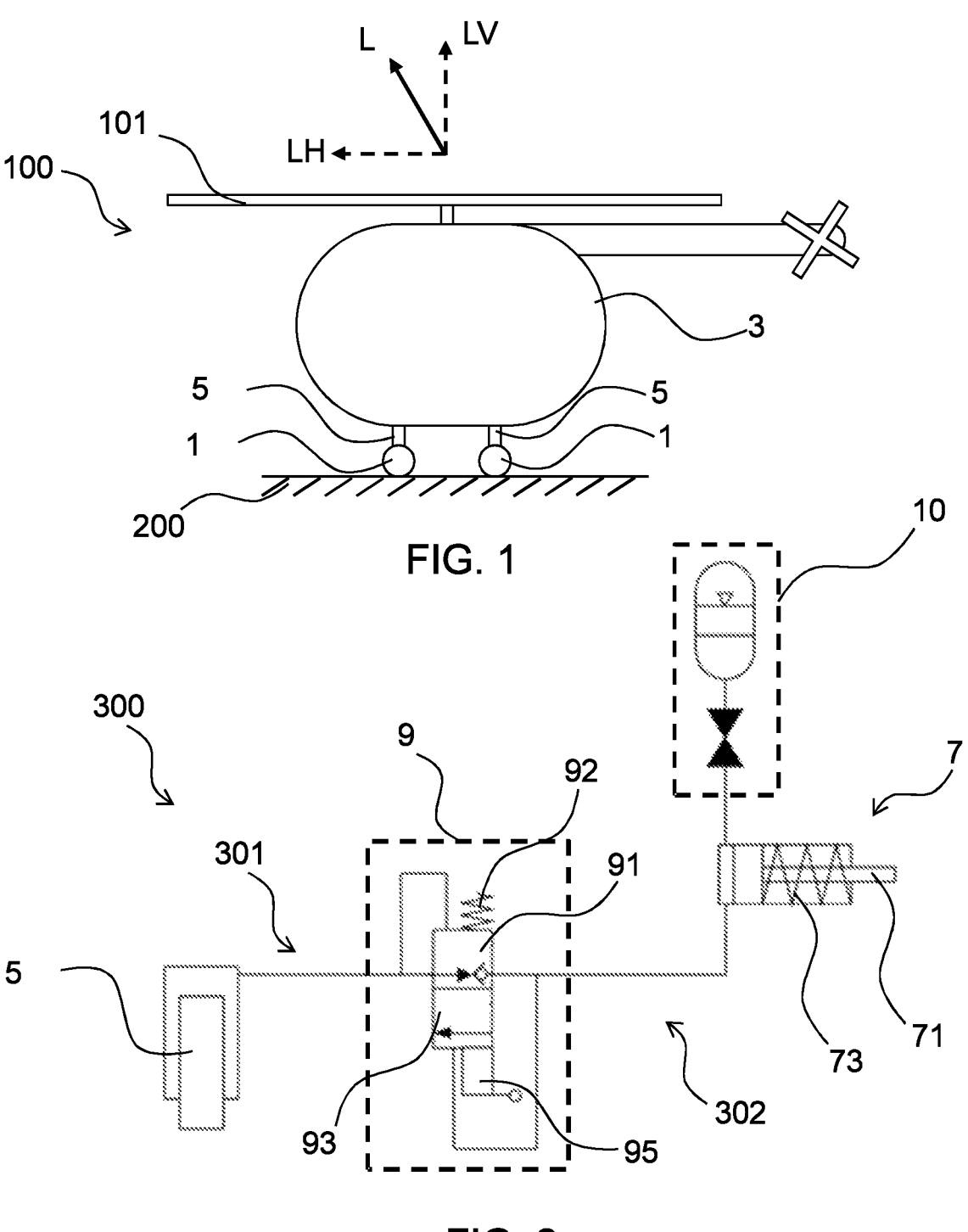
FIG. 1 shows a VTOL aircraft according to an embodiment of the invention.
FIG. 2 shows a hydraulic system the aircraft of FIG. 1 in which a shock absorber and a brake piston are hydraulically coupled by a valve system, and wherein the valve system is shown in a first state in which hydraulic fluid is permitted to flow from the shock absorber to the brake piston via a check valve.

A VTOL aircraft 100 according to an embodiment of the invention is shown in FIG. 1. In this case, the VTOL aircraft 100 is a helicopter comprising wheels 1 that enable the helicopter to taxi whilst situated upon the ground 200 under the horizontal component LH of the lift L generated by the rotor 101. The wheels 1 are attached to the fuselage 3 via hydraulic shock absorbers 5, which bear the weight of the helicopter 100 when the wheels 1 are in contact with the ground 200. Braking of each wheel 1 is controlled by a brake piston 7 that is hydraulically coupled to the shock absorber 5 that the wheel 1 is attached to. The hydraulic coupling is configured such that braking of each of the wheels 1 is controlled by the hydraulic pressure within their respective shock absorbers 5, as described below with reference to FIG. 2.

FIG. 2 illustrates a hydraulic system 300 of the aircraft 100 in which a shock absorber 5 and a brake piston 7 that is configured to effect braking of the wheel 1 attached to the shock absorber 5 are hydraulically coupled by a valve system 9. The valve system 9 comprises a check valve 91 and a return valve 93 that are configured to control the flow of hydraulic fluid between the shock absorber 5 and brake piston 7 during taxi, take-off, and landing of the aircraft 100. The valve system 9 has two states: a first state shown in FIG. 2 and a second state shown in FIG. 3. In the first state, hydraulic fluid is able to flow from the shock absorber side 301 of the valve system 300 to the brake piston side 302 of the valve system 300 via the check valve 91, which prevents fluid flow from the brake piston side 302 to the shock absorber side 301 of the valve system 300. In the second state, the return valve 93 permits unrestricted fluid flow between the shock absorber side 301 of the valve system 300 and the brake piston side 302 of the valve system 300.

Figure 3:
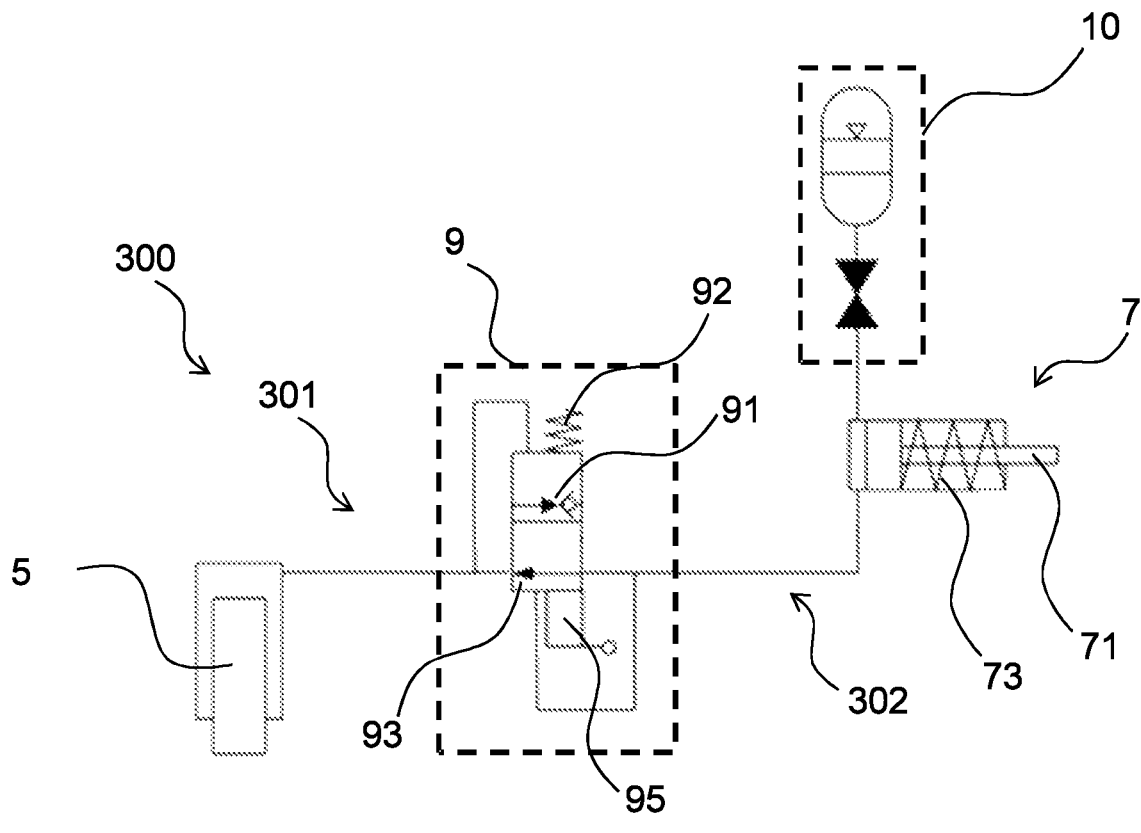
FIG. 3 shows the hydraulic system of FIG. 2 in a second state wherein hydraulic fluid is permitted to flow between the shock absorber and the brake piston via a return valve.

The valve system 9 is actuated between its two states by the forces exerted on the valve system by the relative hydraulic pressures on the shock absorber side 301 of the valve system 300 and on the brake piston side 302 of the valve system 300. As can be seen in FIG. 2 and FIG. 3, the valve system 9 also comprises a spring 92 configured to act in parallel with the force due to the hydraulic pressure on the shock absorber side 301 of the hydraulic system 300. The valve system 9 is actuated to its first state when the force on the valve system 9 due to the hydraulic pressure on the shock absorber side 301 of the hydraulic system 300 plus the force of the spring 92 exceeds the opposing force exerted on the valve system 9 by the hydraulic pressure on the brake piston side 302 of the hydraulic system 300. The valve system 9 is actuated to its second state when the force exerted on the valve system 9 by the hydraulic pressure on the brake piston side 302 of the hydraulic system 300 exceeds the force due to the hydraulic pressure on the shock absorber side 301 plus the force of the spring 92.

The brake piston 7 comprises a piston rod arrangement 71 that is actuatable by the hydraulic pressure on the brake piston 7 side of the valve system 9 to apply a braking torque to the wheel 1. The brake piston 7 also comprises a spring 73 configured to act against the hydraulic pressure applied to piston rod arrangement 71 to bias the piston rod arrangement 71 to a position in which no braking torque is applied to the wheel 1. The brake piston 7 is configured such that the piston rod arrangement 71 is actuated to a position in which a braking torque is applied to the wheel 1 only when the pressure on the brake piston side 302 of the hydraulic system 300 exceeds a threshold pressure, referred to herein as the "zero torque pressure" or "ZTP". Therefore, when the pressure on the brake piston side 302 of the hydraulic system 300 is less than the ZTP, the spring 73 biases the piston rod arrangement 71 to a position in which no braking torque is applied to the wheel 1. It should be noted that, in embodiments of the invention, the piston rod arrangement 71 may be hydraulically displaced when the pressure on the brake piston 7 side of the valve system 9 is below the ZTP; in those embodiments, the piston rod arrangement 71 will be displaced sufficiently to apply a braking torque to the wheel 1 only when the hydraulic pressure exceeds the ZTP.

The aircraft 100 comprises a separate hydraulic system 300 for each shock absorber 5 and wheel 1, therefore the braking torque applied to each wheel is determined by the respective shock absorber 5 to which the wheel 1 is attached. It should be noted that, in embodiments of the invention, a pair or group of wheels may be attached to one or more of the shock absorbers. In those embodiments, there may be more than one brake piston hydraulically coupled with a shock absorber so that a braking torque can be applied to more than one wheel of the pair or group of wheels.

In the absence of braking torque applied to the wheels, the aircraft 100 of the presently described embodiment of the invention is able to taxi under the horizontal component of the lift LH generated by the rotor 101 when the vertical component LV of lift L is equal to approximately 10% of the vertical component of lift LV needed for the aircraft to take off. The ZTP and the threshold pressure at which the valve system 9 is moved to its first state are therefore set to be equal to approximately 90% of the hydraulic pressure within the shock absorber 5 when the aircraft 100 is upon the ground 200 in the absence of any vertical component of lift LV. In other embodiments of the invention, the aircraft may be able to taxi under a greater or lower amount of vertical component of lift. In those embodiments, the ZTP and the threshold pressure at which the valve system is moved to its first state may therefore be different to the presently described embodiment.

The function of the hydraulic system 300 described above during take-off and landing of the aircraft 100 will now be described. When the aircraft 100 is at rest upon the ground 200, with no vertical component of lift LV, the hydraulic pressure within the shock absorber 5 is at its maximum (for the given load carried by the aircraft 100). In this condition, the valve system 9 is in its first state, as shown in FIG. 2, the hydraulic pressure on the shock absorber side 301 of the hydraulic system 300 is equal to the hydraulic pressure on the brake piston side 302, and is greater than the ZTP of the brake piston 7 such that the brake piston 7 exerts a braking torque on the wheel 1.

When the aircraft rotor 101 is engaged and a vertical component of lift LV is generated, the load carried by the shock absorber 5, and thereby the hydraulic pressure within the shock absorber 5 decreases as the vertical component of lift LV increases. However, while the valve system 9 remains in its first state, hydraulic fluid is prevented from moving from the brake piston side 302 to the shock absorber side 301 of the hydraulic system by the check vale 91. The brake piston 7 therefore remains actuated to a position in which the brake piston 7 exerts a braking torque on the wheel 1 while the hydraulic pressure within the shock absorber 5 is greater than the ZTP.

When the vertical component LV of lift L is equal to approximately 10% of the vertical component LV of lift L needed for the aircraft 100 to take off, the pressure within the shock absorber 5 is reduced to equal to the ZTP of the brake piston. At this point, the force exerted on the valve system 9 by the hydraulic pressure on the brake piston side 302 of the hydraulic system 300 exceeds the opposing force exerted due to the hydraulic pressure on the shock absorber side 301 of the hydraulic system 300 plus the force of the spring 92, and the valve system 9 is actuated to its second state, shown in FIG. 3. Hydraulic fluid is then free to flow from the brake piston side 302 to shock absorber side 301 of the hydraulic system 300, and the piston rod arrangement 71 is moved by the spring 73 to a position at which zero braking torque is applied to the wheel 1. The wheel 1 then becomes free to roll so that the aircraft 100 is able to taxi under the horizontal component of the lift LH generated by the rotor 101.

As the vertical component of lift LV further increases and the aircraft 100 leaves the ground 200, the hydraulic pressure within the shock absorber 5 further decreases and hydraulic fluid is pushed from the brake piston 7 side of the valve system 9 to the shock absorber 5 side of the valve system 9 through the return valve 93 by the resilient bias of the brake piston spring 73 pushing hydraulic fluid out of the brake piston 7.

During landing, when the wheel 1 touches the ground 200, the shock absorber 5 is subject to the weight of the aircraft 100 and the hydraulic pressure within the shock absorber 5 consequently increases. The aircraft 100 is able to taxi upon its wheels 1 while the vertical component of lift LV is greater than approximately 10% of the vertical component of lift LV needed for the aircraft 100 to take off (i.e. while the hydraulic pressure within the shock absorber 5 is less than approximately 90% of the hydraulic pressure present when the aircraft 100 is upon the ground 200 in the absence of any vertical component of lift LV).

When the vertical component of lift LV generated by the rotor becomes less than approximately 10% of the vertical component LV of lift needed for the aircraft 100 to take off, the hydraulic pressure within the shock absorber 5 becomes greater than the ZTP such that the force on the valve system 9 due to the hydraulic pressure on the shock absorber side 301 of the hydraulic system 300 plus the force of the spring 92 exceeds the force exerted on the valve system 9 by the hydraulic pressure on the brake piston side 302 of the hydraulic system 300. In this condition, the valve system 9 is moved to its first state, shown in FIG. 2. Hydraulic fluid is then pushed by the shock absorber 5 via the check valve 91 into the brake piston 7 to apply a braking torque to the wheel 1. The wheel 1 is then prevented from rolling.

When the aircraft 100 is at rest upon the ground, the shock absorber 5 can be hydraulically isolated from the brake piston 7 by a manual override handle 95 on the check valve 91. The hydraulic fluid within the brake piston 7 can then be drained into an accumulator 10 situated on the brake piston 7 side of the valve system 9, which is shown in FIG. 2 and FIG. 3, in order to release the brake so that the aircraft 100 can be towed. The accumulator 10 is configured to be able to pump hydraulic fluid back into the brake piston 7 side of the valve system 9 when required, for example, when the aircraft is ready to take-off again. In other embodiments of the invention a solenoid or other type of switch may be used in place of a manual override handle. In some embodiments of the invention the manual override 95 and accumulator 10 may not be present; in these embodiments the aircraft may be jacked for towing with the brakes still applied. In embodiments of the invention not comprising an accumulator hydraulic fluid could simply be drained from the brake system, for example, should there be a desire to disengage the brake piston.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the embodiment of the invention described above, the aircraft 100 comprises a separate hydraulic system 300 for each shock absorber 5 and wheel 1, therefore the braking torque applied to each wheel is determined by the respective shock absorber 5 to which the wheel 1 is attached. However, in some embodiments of the invention, a shock absorber may be hydraulically coupled to the brake piston of a wheel which is not attached to that shock absorber. In other embodiments of the invention, a single shock absorber may be hydraulically coupled to the brake piston of more than one wheel such that the braking torque of more than one of the wheels is controlled by the pressure within a single shock absorber. In other embodiments of the invention, multiple shock absorbers may be hydraulically coupled to the brake piston of a single wheel such that the braking torque of the single wheel is controlled by the one or more of the pressures of the multiple shock absorbers.

While the embodiment of the invention described above is a helicopter, it should be understood that the invention relates to a VTOL aircraft wherein braking of the wheels is controlled by brake pistons which are hydraulically coupled to shock absorbers which bear the weight of the aircraft when the aircraft is situated upon the ground, and wherein the pressure within the shock absorbers is proportional to the vertical component of lift generated by the VTOL aircraft. Therefore, in other embodiments of the invention, the aircraft may be another type of VTOL aircraft, such as a tiltrotor aircraft or a thrust vectoring aeroplane.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A vertical take-off and landing aircraft comprising:
   a first wheel attached to a shock absorber configured to carry at least part of the weight of the vertical take-off and landing aircraft when the first wheel is in contact with a ground surface, wherein a hydraulic pressure within the shock absorber is proportional to the at least part of the weight of the aircraft carried by the shock absorber, and
   a brake piston configured to provide a braking torque to the first wheel or to a second wheel of the aircraft,
   wherein the shock absorber and the brake piston are hydraulically coupled such that, when the hydraulic pressure within the shock absorber exceeds a threshold pressure, the hydraulic pressure within the shock absorber actuates the brake piston to apply a braking torque to the first wheel or to the second wheel of the vertical take-off and landing aircraft.

2. The vertical take-off and landing aircraft as claimed in claim 1, wherein the threshold pressure is in a range of 70% to 95% of the hydraulic pressure within the shock absorber when the vertical take-off and landing aircraft is at rest upon the ground surface, with no vertical component of lift being generated by the vertical take-off and landing aircraft.

3. The vertical take-off and landing aircraft according to claim 1, further comprising a valve system hydraulically connected between the shock absorber and the brake piston, wherein the valve system is configured to permit hydraulic fluid to flow from the shock absorber to the brake piston when the hydraulic pressure within the shock absorber exceeds a threshold pressure.

4. The vertical take-off and landing aircraft according to claim 3, wherein the valve system comprises a check valve configured to permit hydraulic fluid to flow from the shock absorber to the brake piston and to prevent hydraulic fluid flowing from the brake piston to the shock absorber only when the hydraulic pressure within the shock absorber exceeds the threshold pressure.

5. The vertical take-off and landing aircraft according to claim 3, wherein the valve system comprises a return valve configured to allow hydraulic fluid to flow from the brake piston to the shock absorber only when the hydraulic pressure within the shock absorber is equal to or less than the threshold pressure above which the valve system is configured to allow hydraulic fluid to flow from the shock absorber to the brake piston.

6. The vertical take-off and landing aircraft according to claim 5, wherein the valve system comprises:
    a check valve configured to permit hydraulic fluid to flow from the shock absorber to the brake piston and to prevent hydraulic fluid flowing from the brake piston to the shock absorber only when the hydraulic pressure within the shock absorber exceeds a threshold pressure;
    a first state in which the check valve permits hydraulic fluid to flow from the shock absorber to the brake piston and to prevent hydraulic fluid flowing from the brake piston to the shock absorber, and
    a second state in which the return valve permits hydraulic fluid to flow from the brake piston to the shock absorber, and
    wherein the valve system is actuated from the second state to the first state when the pressure within the shock absorber exceeds a threshold pressure, and wherein the valve system is actuated from its first state to its second state when the pressure in the shock absorber is equal to or less than the threshold pressure.

7. The vertical take-off and landing aircraft according to claim 6, wherein the hydraulic pressure in the brake piston and the hydraulic pressure in the shock absorber provide opposing forces on the valve system to actuate the valve system between its first and second states.

8. The vertical take-off and landing aircraft according to claim 7, further comprising a spring, wherein the spring is configured to provide a force on the valve system in parallel with the force exerted on the valve system by the hydraulic pressure in the shock absorber.

9. The vertical take-off and landing aircraft according to claim 1, wherein the threshold pressure is approximately equal to a zero-torque pressure of the brake piston.

10. The vertical take-off and landing aircraft according to claim 1, further comprising a switch that is operable to hydraulically decouple the shock absorber and brake piston.

11. The vertical take-off and landing aircraft according to claim 10, further comprising an accumulator that is operable to drain hydraulic fluid from the brake piston.

12. The vertical take-off and landing aircraft according to claim 1, further comprising a second brake piston configured to provide a braking torque to a third wheel of the aircraft, wherein the shock absorber and second brake piston are hydraulically coupled such that, when the hydraulic pressure within the shock absorber exceeds the threshold pressure, the hydraulic pressure within the shock absorber actuates the second brake piston to apply a braking torque to the third second wheel.

13. The vertical take-off and landing aircraft according to claim 1, comprising:
    a further wheel attached to a further shock absorber configured such that the further shock absorber carries at least part of the weight of the aircraft when the further wheel is in contact with a ground surface, a hydraulic pressure within the further shock absorber thereby being proportional to the weight of the aircraft carried by the further shock absorber, and
    a further brake piston configured to provide a braking torque to the further wheel,
    wherein the further shock absorber and further brake piston are hydraulically coupled such that, when hydraulic pressure within the further shock absorber exceeds a threshold pressure, the hydraulic pressure within the further shock absorber actuates the further brake piston to apply a braking torque to the further wheel.

14. A method to operate a brake on a vertical take-off and landing aircraft including a first wheel attached to a shock absorber and a second wheel, the method comprising:
    increasing a hydraulic pressure in the shock absorber due to the first wheel contacting a ground surface, wherein the hydraulic pressure is proportional to a part the weight of the vertical take-off and landing aircraft carried by the shock absorber; and
    actuating a brake piston to apply a braking torque to the first wheel or to the second wheel using the hydraulic pressure in the shock absorber and in response to the hydraulic pressure in the shock absorber exceeding a threshold pressure.

15. The method of claim 14, wherein the threshold pressure is in a range of 70% to 95% of the hydraulic pressure in the shock absorber when the vertical take-off and landing aircraft is at rest upon the ground surface, with no vertical component of lift being generated by the vertical take-off and landing aircraft.

16. The method of claim 14, wherein a valve system hydraulically connecting the shock absorber and the brake piston, and the method further comprises the valve system allowing hydraulic fluid to flow from the shock absorber to the brake piston when the hydraulic pressure within the shock absorber exceeds a threshold pressure and prevents flow of the hydraulic fluid from the shock absorber to the brake piston when the hydraulic pressure within the shock absorber is below the threshold pressure.

* * * * *